Figure 1:
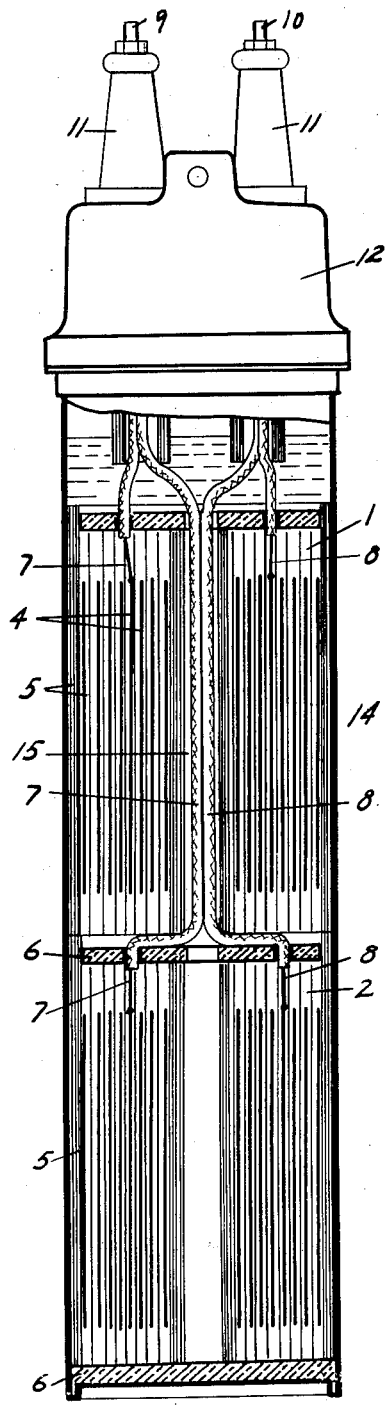

July 19, 1932.  E. G. SIEVERT ET AL  1,868,120
ARRANGEMENT IN CONDENSERS
Filed May 7, 1926

Inventors.
Ernst Gustav Sievert,
and Henning Svensson.
per
Attorney.

Patented July 19, 1932

1,868,120

UNITED STATES PATENT OFFICE

ERNST GUSTAV SIEVERT AND HENNING SVENSSON, OF SUNDBYBERG, SWEDEN

ARRANGEMENT IN CONDENSERS

Application filed May 7, 1926, Serial No. 107,410, and in Sweden May 15, 1925.

In alternating current networks reactive currents, so-called wattless currents, arise, inducing the magnetic fields in conductors and apparatus. Said currents produce, similar to the effective currents, heat in the conductors, on account of which fact power is lost.

This reactive loss of power has been estimated by Th. Holmgren, chief engineer, in an article in "Teknisk Tidskrift", April 4, 1925, to amount to 6 to 10 millions of crowns per year for Sweden. In the same article it is supposed that by compensating this reactive power rationally about half or three quarters of the above sum might be saved or 3 to 7½ millions of crowns per year.

Except this saving in the annual losses in the networks, such power plants which have their machines running on full load and require a ready enlargement may increase their output by 40 to 60%, if the reactive power is compensated. The possibilities of compensating the reactive power has, on account of this fact, been subjected to careful studies by many interested parties.

The electric motor manufacturies have especially made strong efforts to produce suitable motors, so-called compensated motors, which do not cause reactive power in the network. It is said that preventing the arising of reactive power is more easy than compensating an already existing one.

It may be mentioned that if that improving work should be based on this principle, all motors or at least the armatures of the motors should be exchanged for new ones. And even if this is performed the reactive power of the transformers and the conductors should remain to be compensated for.

On account of this it has already been proposed to effect the compensation of the reactive power by means of condensers, by which step the mechanical fittings for the rest may be left unmoved.

The use of condensers is, however, objectionable as the condensers would have to be of great dimensions. The cooling of the condensers has especially offered great difficulties, unless the condensers shall be dimensioned in a way not allowable as to economy and space.

The present invention relates to a special condenser suitable for the construction of a condenser suitable for the above purpose, which condenser may be exposed to a very great load without any hurtful heating taking place. On account of this fact the condenser may be given a dimension, very small in relation to the load. More particularly, the condenser belongs to the group of condensers which consist of metallic foils and insulating layers spirally wound about a cylindrical core. The invention is essentially characterized by the fact that the cylindrical condenser is surrounded by a cylindrical metallic receptacle, the cylindrical side of which contacts directly with the surface of the whole external insulating layer in order to ensure a reliable removing of heat from the condenser.

As to the manufacture and from pure theoretical reasons a good economy is obtained if each condenser is carried out for about ½ kva. and in such a case, if necessary, a plurality of cylindrical condenser units, one placed above the other, may be connected together and surrounded by a metallic cylindrical receptacle filled with oil and common to all of them, the height of said receptacle in this case corresponding to the number of condenser units connected together. With regard to the expansion of the oil it is suitable to give the cylindrical receptacle such a height that it extends about 100–150 mm. above the units.

By means of a condenser carried out in this way an especially efficient cooling is arrived at, the metallic receptacles, the sides of which contact with the condenser, that-is-to-say, have a heat conducting connection with the condenser, effecting a strong exchange of heat between the condenser and the medium enclosing the out-side of the metallic receptacle, which medium may consist of air, water, light oil and the like and possibly be kept circulating by suitable arrangements. Further possible repairing will be easily carried out, a defective condenser together with the metallic receptacle, belonging thereto, being easily exchanged and replaced by a new one, without influencing or dismounting the other condensers in any way.

Figure 2:
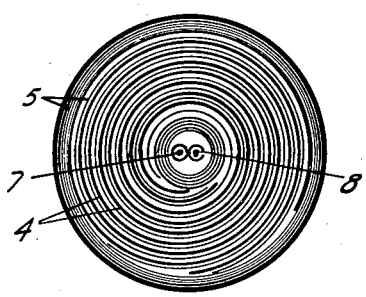

The annexed drawing illustrates, in vertical longitudinal section in Fig. 1 and in cross-section in Fig. 2 an embodiment of a condenser constructed from two condenser units.

1 and 2 are the two condenser units, manufactured by twisting to the shape of a roller two metallic foils 4 with insulating interlayers 5. Both of these condenser units are placed one over the other and rest on suitable supports, for instance wooden discs 6. The longitudinal axes of the condenser rollers have a longitudinal channel 15 receiving the connecting conductors 7 and 8, each connected to a layer 4 in the condenser unit in question and extended to the points of contact 9 and 10 at the ends of the insulators 11, which are attached to the cover 12 of the cylinder 14 constructed of sheet-metal or the like, tightly enclosing the condenser units, that-is-to-say, making contact directly with the external insulating layer 5 of the units, the space of said cylinder 14, which is not occupied by the condenser units and the conductors, being filled with oil by such a quantity that the condenser units will be located entirely below the top surface of the oil.

Having now particularly described the nature of our invention and the manner of its operation, what we claim is:

An electric condenser comprising a plurality of interconnected condenser units each consisting of metallic foils and insulating layers spirally wound about a cylindrical core, said condenser units being arranged coaxially inside a cylindrical metallic casing which tightly encloses said units so as to transfer heat effectively from the interior of the condenser, and which serves at the same time as a common support for the condenser units and as an oil container in which the condenser units are placed immerged in oil.

In testimony whereof we have signed our names to this specification.

ERNST GUSTAV SIEVERT.
HENNING SVENSSON.